United States Patent
Batz et al.

(10) Patent No.: US 12,316,061 B2
(45) Date of Patent: May 27, 2025

(54) METHOD FOR MAKING ELECTRICAL CONTACT WITH A SUPERCONDUCTIVE STRIP CONDUCTOR

(71) Applicant: Siemens Energy Global GmbH & Co. KG, Bayern (DE)

(72) Inventors: Otto Batz, Leutenbach (DE); Michael Frank, Uttenreuth (DE); Peter Kummeth, Herzogenaurach (DE); Marijn Pieter Oomen, Erlangen (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 699 days.

(21) Appl. No.: 17/284,059

(22) PCT Filed: Oct. 15, 2019

(86) PCT No.: PCT/EP2019/077835
§ 371 (c)(1),
(2) Date: Apr. 9, 2021

(87) PCT Pub. No.: WO2020/078937
PCT Pub. Date: Apr. 23, 2020

(65) Prior Publication Data
US 2021/0408700 A1    Dec. 30, 2021

(30) Foreign Application Priority Data
Oct. 15, 2018    (DE) .................. 10 2018 217 612.4

(51) Int. Cl.
*H01R 43/02*    (2006.01)
*H01R 4/68*    (2006.01)
*H01R 4/02*    (2006.01)

(52) U.S. Cl.
CPC .............. *H01R 4/68* (2013.01); *H01R 43/02* (2013.01); *H01R 4/029* (2013.01)

(58) Field of Classification Search
CPC .......... H01R 4/029; H01R 4/68; H01R 43/02; H01R 4/02; H01R 4/023; H01R 4/024; H10N 60/82; H10N 60/80; H01B 1/20
See application file for complete search history.

(56) References Cited

U.S. PATENT DOCUMENTS 5,134,040 A    7/1992  Benz et al.
5,231,366 A *  7/1993  Haramaki .............. H10N 60/80
                                                      29/599

(Continued)

FOREIGN PATENT DOCUMENTS

DE    102012223366 A1    6/2014
DE    102013212042 A1    1/2015

(Continued)

OTHER PUBLICATIONS

Chikumoto et al, "Development of Direct Joint Process Using Cu Stabilizing Layers of REBCO Tapes," in IEEE Transactions on Applied Superconductivity, doi: 10.1109/TASC.2024.3351118, pp. 1-4. (Year: 2024).*

(Continued)

*Primary Examiner* — A. Dexter Tugbang
(74) *Attorney, Agent, or Firm* — Wolter Van Dyke Davis, PLLC (57) ABSTRACT

A method for creating electrical contact between a first superconductive strip conductor and a further electrical conductor element, wherein the first superconductive strip conductor is placed in flat contact against a first main surface of a reactive multilayer film in a contact area of the strip conductor, the second main surface, facing away from the first main surface, of the reactive multilayer film is placed in flat contact against the further electrical conductor element, and a permanent electrically conductive connection is formed between the first superconductive strip conductor and the further electrical conductor element by subsequently (Continued)

igniting an exothermic chemical reaction in the multilayer film. An electrical conductor assembly is able to be contacted using such a method.

17 Claims, 3 Drawing Sheets

(56) References Cited

U.S. PATENT DOCUMENTS

| | | | |
|---|---|---|---|
| 5,521,150 A * | 5/1996 | Murakami | H01R 4/68 228/198 |
| 6,475,958 B1 | 11/2002 | Paul et al. | |
| 8,229,528 B2 | 7/2012 | Nardelli et al. | |
| 8,238,990 B2 | 8/2012 | Nardelli | |
| 9,875,833 B2 | 1/2018 | Frank et al. | |
| 10,241,168 B2 | 3/2019 | Roth | |
| 2003/0038165 A1* | 2/2003 | Polvi | H01R 43/02 228/193 |
| 2004/0009343 A1* | 1/2004 | Igarashi | H01B 1/20 428/327 |
| 2006/0063680 A1 | 3/2006 | Ignatiev et al. | |
| 2010/0022396 A1 | 1/2010 | Otto | |
| 2015/0045231 A1* | 2/2015 | Lacroix | H10N 60/82 361/19 |
| 2015/0236438 A1* | 8/2015 | Rateiczak | H01R 43/02 228/256 |
| 2018/0204658 A1* | 7/2018 | Osabe | H01B 12/06 |
| 2021/0050768 A1 | 2/2021 | Arndtt et al. | |

FOREIGN PATENT DOCUMENTS

| | | |
|---|---|---|
| DE | 102018203139 A1 | 9/2019 |
| EP | 1107322 A2 | 6/2001 |
| JP | 2000133067 A | 5/2000 |
| JP | 2007502214 A | 2/2007 |
| JP | 2011529255 A | 12/2011 |
| JP | 2013235699 A | 11/2013 |
| JP | 2016112753 A | 6/2016 |
| JP | 2017017318 A * | 1/2017 |
| WO | 2005042240 A2 | 5/2005 |
| WO | 2005079220 A2 | 9/2005 |
| WO | 2009127956 A1 | 10/2009 |
| WO | 2014206751 A1 | 12/2014 |
| WO | 2015049358 A1 | 4/2015 |
| WO | 2015114359 A1 | 8/2015 |

OTHER PUBLICATIONS

International search report and written opinion dated Feb. 24, 2020 for corresponding PCT/EP2019/077835.

PCT International Search Report and Written Opinion of International Searching Authority mailed Feb. 24, 2020 corresponding to PCT International Application No. PCT/EP2019/077835 file Oct. 15, 2019 (previously cited).

Melhem Ziad et al: "High Temperature Superconducting (HTS) Coils for a Compact Spherical Tokamak", In: IEEE Transactions on Applied Superconductivity, vol. 25, No. 3, Jun. 2015.

Matteau Jacques: "NanoBond<ID Assembly: A Rapid, Room Temperature Soldering Process"; indium.us/F018; Indium Corporation; 2014.

* cited by examiner

METHOD FOR MAKING ELECTRICAL CONTACT WITH A SUPERCONDUCTIVE STRIP CONDUCTOR

CROSS REFERENCE TO RELATED APPLICATIONS

This application is the US National Stage of International Application No. PCT/EP2019/077835 filed 15 Oct. 2019, and claims the benefit thereof. The International Application claims the benefit of German Application No. DE 10 2018 217 612.4 filed 15 Oct. 2018. All of the applications are incorporated by reference herein in their entirety.

FIELD OF INVENTION

The present invention relates to a method for forming an electrical contacting between a first superconducting strip conductor and a further electrical conductor element, wherein a permanent electrically conductive connection is formed between a contact region of the first superconducting strip conductor and the further conductor element. Furthermore, the invention relates to an electrical conductor composite assembly in which a first superconducting strip conductor and a further electrical conductor element are permanently electrically conductively connected in such a way.

BACKGROUND OF INVENTION

In the field of superconducting machines and superconducting magnet coils, coil devices are known in which superconducting strip conductors are wound in coil windings. These are often high-temperature superconductors (HTS), that is to say superconducting materials having a transition temperature of above 25 K, and above 77 K in some material classes. These high-temperature superconductors are typically present in the form of flat strip conductors comprising a strip-shaped substrate strip and a superconductor layer arranged on the substrate strip. In addition, the strip conductors often comprise even further layers such as stabilization layers, contact layers, buffer layers and, in some cases, also insulation layers. The most important material class of the so-called second generation HTS superconductors (2G-HTS) includes compounds of the type $REBa_2Cu_3O_x$, wherein RE stands for a rare earth element or a mixture of such elements.

The substrate strip typically consists either of steel, a nickel-tungsten alloy or the alloy Hastelloy. The electrical contact with an external electrical circuit is usually established by way of a normally conducting cover layer or stabilization layer composed of copper or silver, wherein this normally conducting layer either is applied on one side over the superconducting layer or can surround the entire strip conductor as an enveloping layer. In order to establish the electrical contact, the outermost normally conducting layer is typically connected to a contact piece composed of copper by means of a soldering process, wherein said contact piece is electrically conductively connected to further elements of the external electrical circuit during operation. Typically, for each such coil device, two soldering contacts of this type are present for connection to corresponding contact pieces, such that the entire coil winding can be linked into an electrical circuit by way of two end regions and in this way, for example, can be connected to an external power source.

However, some superconducting coil devices require not only electrical contacts with normally conducting contact pieces, but also electrical contacts between individual segments of the superconducting strip conductor. This may be desirable for various reasons: by way of example, the total length of the strip conductor required for a coil winding may be greater than the length that can be produced on one piece. In that case, it is necessary to connect a plurality of segments of the strip conductor for a superordinate overall conductor of the coil winding. Alternatively, it may also be expedient to turn the orientation of the strip conductor within the coil winding. This is expedient for example if the strip conductor has a preferred side for the contacting with a normally conducting contact piece. In such a case, it may be expedient to provide an additional inner winding contact between two strip conductor parts in order that the preferred contact area is freely accessible both on a radially inner side and on a radially outer side of the coil. Such an inner winding contact is described in DE 102012223366 A1, for example. A further reason for the contacting of a plurality of strip conductor parts may reside in the fact that the intention is to produce a coil with a small space requirement at the head sides of the coil and that a 90° turn within the plane of the strip conductor is therefore intended to be attained in a spatially confined region. This can be achieved in a particularly space-saving manner by way of a contacting of a plurality of correspondingly positioned partial conductors of the strip conductor, as described in the German patent application having the file reference 102018203139.8, which has not yet been laid open. Finally, a further reason for a contacting of two ends of the same strip conductor may reside in the fact that the intention is to form a conductor loop that is closed in a ring-shaped fashion for the purpose of forming a continuous current or at least a pseudo-continuous current.

Both the contacting of a superconducting strip conductor with a normally conducting contact piece and the contacting with a further strip conductor are often created by means of a conventional soldered connection according to the prior art. Such a conventional soldered connection is produced by a procedure in which the two elements to be connected and a solder layer having a comparatively low melting point applied therebetween are jointly heated to a temperature above the melting point of the solder material. What is disadvantageous about the electrical contacting of a superconducting strip conductor by means of such a conventional soldered connection is that the high-temperature-superconducting layers of the wound strip conductors are very sensitive vis-à-vis thermal damage and in particular vis-à-vis delamination. In the event of mechanical or thermal loading of the layer stack of the strip conductor, delamination occurs very easily, which directly impairs the superconducting properties and can even result in destruction of the strip conductor. This risk of the delamination of the superconducting layer and/or of the normally conducting cover layer is manifested both during the production of the soldering contact by virtue of the heating performed in the process and during cooling down and during operation of the coil winding contacted by means of soldering. During soldering, the strip conductor of the coil winding is brought to a temperature of typically at least 130° C. to 180° C. over its entire thickness at least in the region of the contact point. This is very close to the thermal loading limit of customary strip conductors, which is usually in the vicinity of 200° C. During the subsequent electrical contacting of a coil winding that has already been potted with potting compound, the potting compound can also be thermally damaged during contacting as a result of the soldering process.

A further method known from the prior art for contacting superconducting strip conductors consists in forming a pressing connection between the strip conductor and the further electrical conductor element. In the case of such a pressing connection, the elements to be connected are pressed against one another mechanically fixedly, for example by means of fixed screwing or clamping. In this case, in order to improve the electrical contact, for example, a readily deformable and electrically conductive indium film can also be inserted between the elements to be connected. However, such a pressing connection has the disadvantage that this necessitates a relatively large amount of additional structural space and the mechanical elements of the clamping device or screwing device likewise make an additional contribution to the weight of the coil device. These additional mechanical elements are undesirable in applications which are weight-critical or in which the superconducting strip conductor is subjected to high accelerations.

SUMMARY OF INVENTION

It is therefore an object of the invention to specify a method for forming an electrical contacting of a superconducting strip conductor which overcomes the disadvantages mentioned. In particular, the intention is to make available a contacting method which enables a contacting with a low risk of damage to the superconducting strip conductor in conjunction with a small space and volume requirement. A further object is to make available an electrical conductor composite assembly comprising a superconducting strip conductor contacted in this way.

These objects are achieved by means of the method described herein and the conductor composite assembly described herein.

The method according to the invention serves for forming an electrical contacting between a first superconducting strip conductor and a further electrical conductor element. In this case, the first superconducting strip conductor, in a contact region of the strip conductor, is brought into areal contact with a first main surface of a reactive multilayer film. Furthermore, the second main surface of the reactive multilayer film facing away from the first main surface is brought into areal contact with the further electrical conductor element. Afterward, a permanent electrically conductive connection between the first superconducting strip conductor and the further electrical conductor element is formed by triggering an exothermic chemical reaction in the multilayer film.

In this case, in principle, the first two steps mentioned, that is to say placing a strip conductor and multilayer film against one another and placing multilayer film and the further conductor element against one another, can be effected in any desired order or else simultaneously. The last step mentioned, that is to say triggering the multilayer film, is then intended to be effected after the two aforementioned steps—that is to say after the multilayer film has been positioned between the strip conductor and the further conductor element.

The reactive multilayer film mentioned should be understood to mean such a film which is formed from a layer stack of a plurality of partial layers. It is intended to be "reactive" in the sense that after the film has been activated, an exothermic chemical reaction can proceed within the film which keeps going independently after the triggering. The exothermic chemical reaction thus propagates in particular from a partial region of the film in which it was triggered into the remaining regions of the film. This propagation arises owing to the fact that the reaction heat of the exothermic chemical reaction from a region that has already reacted supplies the necessary activation energy for the adjoining regions of the film that have not yet reacted. In particular, the individual partial layers of the multilayer film are formed from at least two different materials. In this case, the different materials are present in partial layers of the layer stack that respectively alternate with one another. The at least two different materials of the partial layers form in particular two different reagents (that is to say starting materials) for the exothermic chemical reaction. In this case, the individual partial layers of the multilayer film are in particular each embodied in comparatively thin fashion, thus resulting in a small spatial distance between the starting materials involved in the exothermic reaction. This small spatial distance facilitates both the triggering and the propagation of the exothermic reaction. The thermal energy generated during the exothermic reaction is then utilized as process heat according to the invention in order to form the permanent electrical connection between the elements mentioned. By way of example, such a connection can be produced by means of a soldering process, wherein the energy of the exothermic reaction is used to heat the solder. In this case, the solder can be formed from the materials of the multilayer film and/or from some other material. However, the connection method is not intended to be restricted to a soldering method. Other ways of forming a permanent electrically conductive connection are also suitable which necessitate a heating step for producing the connection, for example also welding or hot adhesive bonding using an electrically conductive adhesive.

One major advantage of the method according to the invention in comparison with conventional soldering methods is that the superconducting strip conductor to be contacted does not have to be heated greatly during the contacting method. This is achieved by virtue of the fact that the film inserted between the strip conductor and the further conductor element serves as a narrowly delimited local heat source for the connection process on account of the exothermic chemical reaction initiated in said film. This brings about local heating of sufficient intensity to form the permanent electrical connection (for example by way of local soldering). By virtue of the fact that the film is embodied in comparatively thin fashion in comparison with the strip conductor and the further conductor element, the energy input during the exothermic reaction is limited to such an extent that the heating concentrates on a narrowly delimited spatial region in direct proximity to the film. Great heating of the superconducting layer of the strip conductor is advantageously avoided in the process. It is the case that as a result of the triggering of the exothermic chemical reaction a very high temperature is generated within the film and in the layers directly adjoining the film. On account of the comparatively small amount of energy released and the comparatively high heat capacities of the adjacent strip conductor and the adjacent further conductor element, only the region directly adjoining the film is heated, and even this region is heated only for a very short time. The remaining regions of strip conductor and further conductor element are not subjected to the high reaction temperature and remain at a comparatively low temperature level in the vicinity of room temperature. In this case, the momentary heat pulse in the region of the reactive film and the surfaces directly adjoining the latter nevertheless suffices to greatly heat, and in particular melt, the material of the film and/or of the surfaces adjoining the latter and thereby to form a permanent, areal electrically conductive connection.

The high, but spatially very narrowly delimited heating in the region of the film affords the additional advantage that overall a conductor composite assembly can be produced in which different materials having distinctly different coefficients of thermal expansion are present. By way of example, partial layers having greatly different coefficients of expansion can be present within the superconducting strip conductor. By virtue of the fact that great heating takes place only at the outermost surface and is avoided in the layer system further inward and on the side of the strip conductor facing away from the contact region, this advantageously prevents great thermal stresses in the layer system during the formation of the contact.

The electrical conductor composite assembly according to the invention comprises at least one first superconducting strip conductor and at least one further electrical conductor element. In this case, a permanent electrically conductive connection is produced in a contact region between the first superconducting strip conductor and the further electrical conductor element, said connection being formed by triggering an exothermic chemical reaction in a multilayer film. The advantages of the conductor composite assembly according to the invention are evident analogously to the advantages of the method according to the invention as described further above. The use of a reactive multilayer film for generating the quantity of heat required during the contacting is identifiable in the conductor composite assembly formed in this way by virtue of the fact that the starting materials from the multilayer film are present as material constituents of a connection layer formed in a contact region. In this case, the starting materials can for example jointly constitute the main constituent of the connection layer or else they can be present as a secondary constituent alongside some other essential material of the connection layer (for example a solder material and/or copper). In this case, the starting materials of the multilayer film and the optional further materials can in particular jointly form an intermetallic compound if the starting materials and the solder material are in each case metals or metallic alloys.

It is additionally also possible to differentiate an electrical conductor composite assembly produced in the manner described from a conventionally soldered conductor composite assembly by virtue of the fact that the connection layer forming the permanent contact was recognizably formed by a melting process and that the melting point required for this is significantly above the temperature at which the first superconducting strip conductor would undergo irreversible damage. If the superconducting strip conductor does not exhibit such irreversible damage, it follows from the features specified above that the electrical elements connected to one another here cannot have been heated to the necessary process temperature in their entirety, in contrast to the conventional soldering process.

Advantageous configurations and developments of the invention are evident from the claims dependent on the independent claims and from the following description. In this case, the described configurations of the method and of the conductor composite assembly can be generally advantageously combined with one another.

In this regard, the permanent electrically conductive connection formed can advantageously be a soldered connection between the first superconducting strip conductor and the further electrical conductor element. The quantity of heat released by means of the exothermic chemical reaction of the multilayer film can thus be used particularly advantageously for melting a solder material, whereby a permanent electrically conductive connection is formed. In accordance with a first embodiment variant, the solder material can substantially be formed from the starting materials of the multilayer film itself. Alternatively or additionally, however, the solder material can also contain the material of one or more further solder layers which can be applied for example to the corresponding surfaces of the first superconducting strip conductor and/or of the further electrical conductor element that are situated in the contact region.

The soldered connection formed can thus advantageously be formed by a connection layer, the majority of which is formed from the materials of the reactive multilayer film. The term "majority" should be understood here to mean that at least 50 percent by volume of the connection layer formed emerges from the starting materials of the multilayer film.

Generally and independently of the exact material proportions of the connection layer, said connection layer can be formed from a material which is an intermetallic compound composed of the starting materials of the multilayer film and optionally additionally composed of one or more further metallic materials of the adjoining surfaces of the first superconducting strip conductor and/or the further electrical conductor element. Such a further metallic material can advantageously be copper, in particular. The reaction temperature of the exothermic chemical reaction can be high enough in particular to melt a copper layer adjacent to the film. This copper can then form an intermetallic compound with the starting materials of the multilayer film. Such a copper layer or copper-containing layer can be present for example on an outer side of the superconducting strip conductor. Alternatively or additionally, such a copper layer or copper-containing layer can be present on an outer surface of the further electrical conductor element. Particularly advantageously, the further electrical conductor element can substantially be formed from copper or a copper-containing alloy.

Generally, the soldered connection can be formed by a connection layer comprising the materials of the reactive multilayer film and additionally the material of at least one further solder layer. Optionally, the connection layer can additionally comprise further material constituents, for example the above-described copper or copper-containing material from the adjoining layers of the superconducting strip conductor and/or the further conductor element. The "further solder layer" described should be understood to mean, in particular, a layer which is present in the contact region on a surface of the superconducting strip conductor and/or of the further conductor element before the triggering of the film. It is advantageously formed from a material having a comparatively low melting point. Different solder layers (in particular composed of different solder materials) can also be present on the superconducting strip conductor and the further conductor element. In particular, the at least one further solder layer is intended to be formed from a material having a lower melting point than copper. Particularly advantageously, the further solder layer is formed from a material having a melting point of less than 400° C. Particularly advantageously, such a material can be a tin-containing solder alloy. If the heat required for melting such a solder material is formed by the reaction heat of the exothermic reaction of the film, mixing of the solder material and the materials of the film occurs particularly readily. Thus, a corresponding material mixture and/or a compound formed from the materials mentioned are/is then present in the connection layer. This can be, in particular, an electrically conductive intermetallic compound.

In accordance with one embodiment of the method, the first superconducting strip conductor and the further electrical conductor element can be pressed against one another during the triggering of the exothermic chemical reaction. Such pressing is particularly advantageous in order to form an electrically conductive connection between the elements mentioned that is as stable as possible and has the lowest possible resistance. The pressure used during pressing can be for example in the range of between 0.2 N/mm$^2$ and 5 N/mm$^2$, in particular in the vicinity of 1 N/mm$^2$.

In accordance with one advantageous embodiment variant of the method, the further electrical conductor element can be a second superconducting strip conductor. In other words, the method according to the invention can be used to contact two superconducting strip conductors areally with one another. For the reasons mentioned in the introduction, in particular, an electrical conductor composite assembly embodied in this way can be used in a superconducting electrical coil winding with a plurality of superconducting partial conductors. However, the second superconducting strip conductor can alternatively also be a conductor element of a superconducting power feed for a superconducting coil. As a result of the general advantages of the method according to the invention, the two superconducting strip conductors connected to one another are protected against thermal damage during the connection process. Nevertheless, very high temperatures can be present in the contact region during the exothermic reaction of the film and thus during the formation of the connection layer.

In accordance with an alternative embodiment variant of the method, however, the further electrical conductor element can also be a normally conducting contact piece. Such a normally conducting contact piece can be provided in particular for connecting a coil winding formed from the first superconducting strip conductor to an external electrical circuit. Particularly advantageously, the normally conducting contact piece can substantially consist of copper or substantially consist of a copper-containing alloy. Overall, a contacting of comparatively low resistance can be achieved as a result. The normally conducting contact piece can be provided in particular in an end region of a coil winding formed from the superconducting strip conductor. Such an end region can be, for example, a radially inner end region of the coil or a radially outer end region of the coil.

Generally advantageously, the triggering of the exothermic chemical reaction can be initiated by an electrical triggering pulse, by an optical triggering pulse and/or by a thermal triggering pulse. By way of example, an electrical triggering pulse can be achieved by an electrical voltage being applied for a short period in a partial region of the film. An optical and/or thermal triggering pulse can be achieved for example by the action of a laser for a short period in a partial region of the film. The advantageous configurations of the triggering mentioned are all suitable for initiating a chemical reaction in the film by way of the release of an initial amount of energy. Proceeding from that partial region of the film in which the triggering pulse is taken up, the chemical reaction can then propagate independently in the manner described.

In accordance with one advantageous embodiment of the method, a reaction temperature that is in the range of between 1000° C. and 2000° C. can be formed by the triggering of the exothermic chemical reaction. With multilayer films available nowadays, such high reaction temperatures can readily be reached in the spatially delimited surroundings of the film. Particularly advantageously, the reaction temperature is in a range of between 1200° C. and 1800° C., very particularly advantageously in a range of between 1500° C. and 1800° C. With such high reaction temperatures it is possible, in particular, not just to effect rapid melting of one or a plurality of solder layers having a low melting point that are adjacent to the film, rather it is even possible to effect incipient melting of a copper-containing layer present on the adjacent surface of the superconducting strip conductor and/or the further conductor element.

A major advantage of the use of the multilayer film described as a heat source resides in the fact that a very high temperature is reached in the region of the connection layer to be formed, but nevertheless a particularly high temperature is not reached in the region of the superconductor material of the strip conductor. This is generally achieved in particular by virtue of the fact that the superconductor material of the strip conductor is not present in the region of its outer surface, but rather in the inner region. The superconductor material of the strip conductor can remain at a temperature of less than 200° C. in particular during the entire contacting method. The thermal loading limit of the superconducting layer of the strip conductor can be undershot in this way. Particularly advantageously, said thermal loading limit can even be significantly undershot, for example by the superconductor material permanently remaining below a temperature of 100° C.

In connection with the present invention it is surprising that the process temperature for forming the electrical connection can be chosen so high even though the process temperature is so far above the damage limit of typical superconductor materials. This is achieved firstly as a result of the comparatively small amount of energy that is released only very locally within the reacting film. The narrow local delimitation of the very high temperature present for a short period is also fostered by the high reaction speed and in particular the propagation speed of the reaction within the film. In this regard, the lateral propagation speed of the exothermic reaction within the reactive film can be for example generally in the range of between 5 m/s and 100 m/s, in particular between 5 m/s and 30 m/s. What is achieved by such a high propagation speed is that the high reaction temperature is present for only an extremely short period of time at a given point of the film. The amount of energy and the duration of the temperature effect are too short to allow a corresponding temperature increase to advance as far as the superconducting layer of the strip conductor that is further inward.

It has been found, surprisingly, that thermal damage to a superconducting layer of the strip conductor can be avoided even if the superconducting layer is at a distance of less than 200 μm from the reactive film during the reaction. The distance between the superconducting layer and the reactive film can be, in particular, in the range of between 10 μm and 200 μm, particularly advantageously between 20 μm and 100 μm.

Generally advantageously, the material of the reactive multilayer film can comprise aluminum and/or nickel. Particularly advantageously, a multiplicity of layers formed alternately from aluminum as the majority and from nickel as the majority are present within the film. Such an aluminum-nickel multilayer film is particularly suitable for forming nickel aluminide as a result of a strong exothermic reaction. The nickel aluminide that arises is present in molten form during the reaction, but solidifies to form a solid electrically conductive layer upon cooling to room temperature. In other words, the nickel aluminide that arises can here itself serve as solder material in the connection layer formed. Optionally, however, the nickel aluminide formed can also mix and/or combine with a material from an adjoining surface of the strip conductor and/or of the further conductor element. Such a material can be for example copper, a copper alloy and/or the material of a tin-containing solder layer.

Generally and independently of the exact material composition, the multilayer film can form a layer system comprising an alternating sequence of two materials, wherein these two materials can enter into an exothermic chemical reaction with one another. The formation of an electrically conductive reaction product is generally advantageous here in order to form a connection layer having the lowest possible resistance between the two elements that are to be electrically contacted. This is not absolutely necessary, however: if metallic surfaces of the elements to be contacted (and in particular solder layers applied on such surfaces) are melted or incipiently melted during the contacting, an overall electrically conductive connection layer can be formed even if the majority of said layer consists of the metallic material of the surface and said layer comprises an electrically insulating reaction product of the multilayer film only as a secondary constituent.

Besides the nickel-aluminum multilayer film described, other material combinations are also known from which reactive multilayer films can likewise be formed. By way of example, such a multilayer film can also comprise alternating layers of aluminum and titanium, of titanium and amorphous silicon, of titanium and boron, or of aluminum and palladium. These material combinations also enable the momentary, locally delimited formation of a high reaction temperature as a result of exothermic reaction of the two main components alternating with one another.

Generally and independently of the exact material composition, the reactive multilayer film can have a total thickness in the range of between 10 µm and 300 µm, in particular between 20 µm and 200 µm. A film thickness chosen in this way is particularly suitable for providing an amount of energy sufficient for melting the materials. On the other hand, however, the amount of energy released with such films is sufficiently limited that the remaining regions of the elements to be connected are not concomitantly heated to the high reaction temperature.

Generally and independently of the exact material composition, the reactive multilayer film can be a nanostructured multilayer film. In other words, the thickness of the individual partial layers of the layer system can be in each case less than 1 µm. In particular, the layer thickness of the individual partial layers can be in each case in a region of between 10 nm and 200 nm. The layer thicknesses of the individual partial layers here can in particular also be chosen differently, wherein the layer thickness chosen can be chosen particularly advantageously depending on the material of the respective partial layer.

Generally advantageously, the superconducting strip conductor can comprise a superconducting layer, and in particular a high-temperature-superconducting layer. The superconducting layer can be embodied in comparatively thin fashion in particular in relation to the total thickness of the strip conductor. High-temperature superconductors (HTS) are superconducting materials having a transition temperature of greater than 25 K, and greater than 77 K in the case of some material classes, in the case of which the operating temperature can be attained by cooling with cryogenic materials other than liquid helium. HTS materials are particularly attractive since these materials can have high upper critical magnetic fields and high critical current densities depending on the choice of operating temperature. The high-temperature superconductor can comprise for example magnesium diboride or an oxide-ceramic superconductor, for example a compound of the type $REBa_2Cu_3O_x$ (REBCO for short), wherein RE stands for a rare earth element or a mixture of such elements. The HTS materials mentioned can easily be damaged thermally by excessive heating, which typically results in a loss of the superconducting properties. Therefore, the advantages of the invention are particularly useful in connection with these HTS materials.

A contact resistance relative to the contact area of less than 500 nohms·cm$^2$ can advantageously be achieved in the contact formed in the manner described. Particularly advantageously, said contact resistance is in the range of less than 100 nohms·cm$^2$ and in particular between 10 nohms·cm$^2$ and 50 nohms·cm$^2$. Such low contact resistances had already been able to be realized by means of commercially available multilayer films. With sufficiently large contact areas, it is thereby possible to achieve absolute contact resistances that are low enough to enable for example applications of conductor composite assemblies formed in this way in superconducting electrical coil devices. For this purpose, the contact area can be in a range of between 1 cm$^2$ and 10 cm$^2$, for example. By way of example, the contact area can extend over a significant portion of the width of the superconducting strip conductor (typically between 4 mm and 20 mm) and over a few centimeters in the longitudinal direction of the strip conductor.

Generally advantageously, the method can be carried out in a flux-free manner and in particular without an organic flux. In contrast to conventional soldering methods, the use of such a flux is not necessary on account of the particularly high local process temperature. A major advantage of this embodiment is that the connection layer formed can be free of the residues of the flux and also free of shrink holes. As a result, the contact resistance can advantageously be reduced in comparison with a soldering process with such a flux.

In accordance with one advantageous embodiment of the electrical conductor composite assembly, the permanent electrical connection is formed by a soldered connection by means of a connection layer. In one particularly advantageous embodiment, this connection layer comprises an intermetallic compound having the constituents aluminum and nickel. Optionally, additional metallic constituents can be present here, such as, for example, copper, tin, and/or further constituents of a tin-containing solder having a low melting point.

Moreover, the embodiment variants of the method described further above are also manifested for the advantageous embodiments of the electrical conductor composite assembly. In this regard, in particular, the conductor composite assembly can be a conductor composite assembly between two superconducting strip conductors. Alternatively, the conductor composite assembly can be a conductor composite assembly between a superconducting strip conductor and a normally conducting contact piece.

BRIEF DESCRIPTION OF THE DRAWINGS

The invention is described below on the basis of some advantageous exemplary embodiments with reference to the appended drawings, in which.

DETAILED DESCRIPTION OF INVENTION

In the figures, identical or identically acting elements are provided with identical reference signs.

Figure 1:
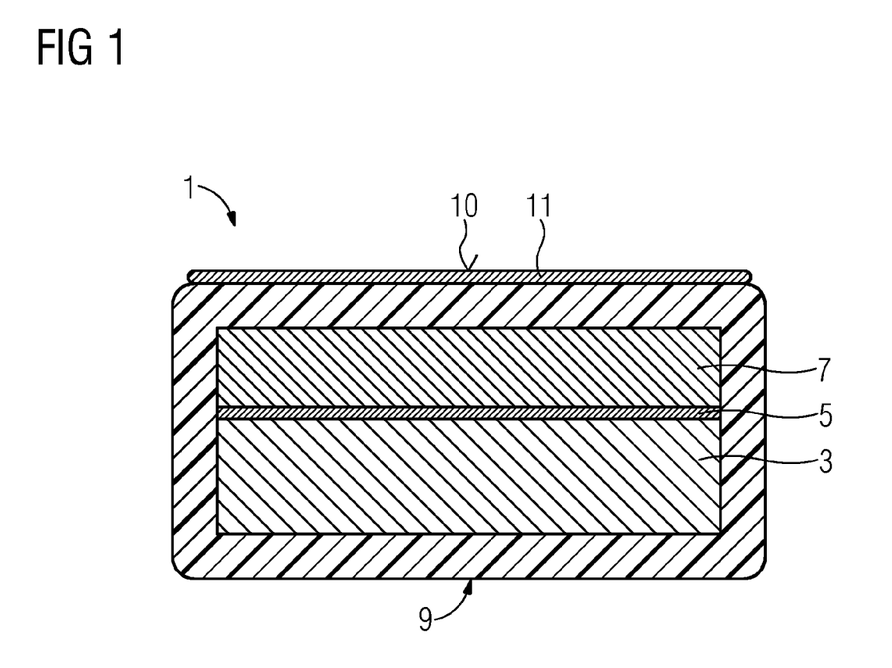
FIG. 1 shows a schematic cross-sectional illustration of a superconducting strip conductor that is intended to be contacted by the method according to the invention.

FIG. 1 shows a schematic cross-sectional view of a strip conductor 1 such as can be used in the contacting method according to the invention, for example. The strip conductor 1 comprises a strip-shaped metallic substrate 3. On one of the two main surfaces of this substrate 3, a planar superconducting layer 5 is deposited over a stack of buffer layers, not shown here. Said superconducting layer 5 is in turn covered with a metallic cover layer 7. Said cover layer 7 can consist of copper or silver or a stack of both materials, for example. The substrate, the superconducting layer 5 and the cover layer 7 and also the buffer layers (not illustrated) are jointly enveloped by an outer normally conducting stabilization layer 9. Said stabilization layer 9 is formed from copper, for example. Optionally, a solder layer 11 composed of a solder material having a comparatively low melting point can additionally be formed on a contact area 10 of the strip conductor 1. This can be beneficial for the formation of an electrical contact having a comparatively low resistance by means of the contacting methods described further below, but is not absolutely necessary.

Figure 2:
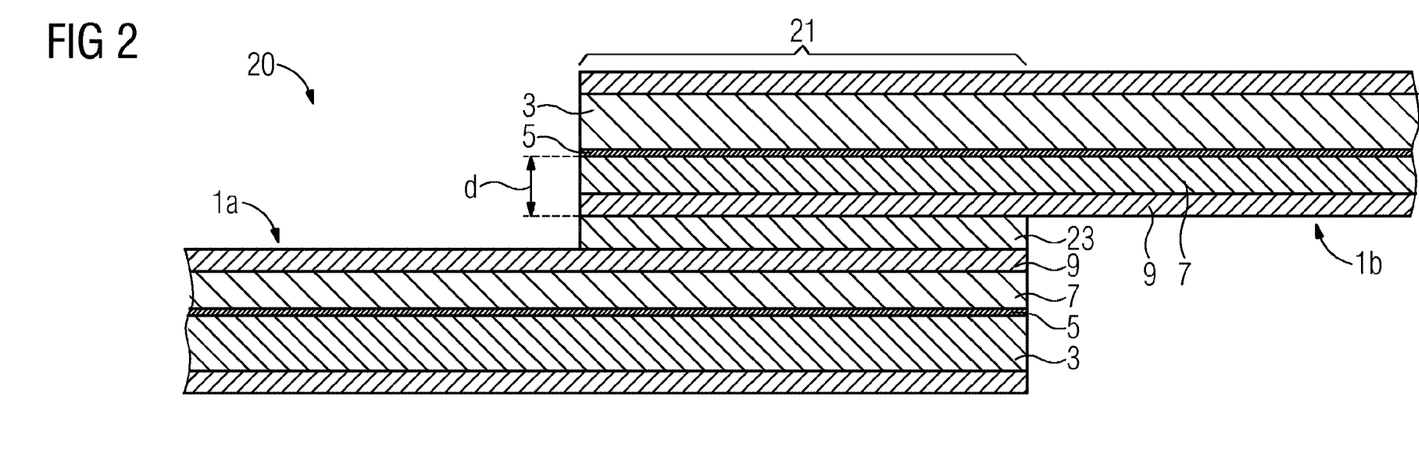
FIG. 2 shows a schematic longitudinal section of two superconducting strip conductors that have been contacted with one another according to the method according to the invention.

FIG. 2 shows a schematic longitudinal section through an electrical conductor composite assembly 20 according to a first exemplary embodiment of the invention. The conductor composite assembly 20 comprises a first superconducting strip conductor 1a and a second superconducting strip conductor 1b, which have been contacted with one another according to an embodiment of the method according to the invention. The two strip conductors 1a and 1b here can be embodied for example in each case in a similar manner to that in the example in FIG. 1. In any case they comprise an inner superconducting layer 5 and an outer normally conducting layer (here the enveloping stabilization layer 9).

The two strip conductors 1a and 1b are connected to one another by a permanent electrically conductive connection in a contact region 21. This connection is formed by a connection layer 23 composed of an electrically conductive material. This connection layer 23 was formed by triggering a reactive multilayer film inserted between the two strip conductors 1a and 1b. In this case, the two strip conductors 1a and 1b to be contacted were pressed against one another during triggering. Upon the triggering of the reactive multilayer film, an exothermic chemical reaction was initiated within the film, wherein the materials present in the partial layers of the film reacted with one another. In this case, the reaction temperature was significantly above 1000° C. However, the zone heated in the process was restricted to the multilayer film placed between the two strip conductors and the surfaces of the two strip conductors directly adjoining said film. In this case, therefore, only the surface of the stabilization layer 9 respectively facing the other strip conductor was heated, and the remaining layers 3, 5 and 7 of the strip conductor and the side of the stabilization layer 9 facing away remained at a temperature close to room temperature in this case. The connection layer 23 was thus formed during this exothermic reaction. In this case, the material of the connection layer was initially present in a molten state and then solidified to form a solid connection layer 23 during subsequent cooling down.

The connection layer 23 thus comprises at least the materials of the original multilayer film. In addition, it can optionally also comprise the material of the layers 9 directly adjoining the connection layer 23. In the example shown in FIG. 2, these adjoining layers 9 are formed as stabilization layers composed of copper. Besides the materials of the multilayer film, the connection layer 23 here thus additionally comprises copper as well since the copper from these adjoining layers was superficially melted during the hot exothermic reaction. In this case, the connection layer formed can be present in particular as an intermetallic compound composed of the materials mentioned. It is electrically conductive in any case, such that a permanent areal electrical contact between the two strip conductors 1a and 1b is mediated via the connection layer 23.

As an alternative or in addition to the incorporation of the material of the stabilization layer 9, however, the connection layer 23 can also comprise the material of a solder layer, which is not illustrated here but is optionally applied to the contact areas of the respective strip conductors and was illustrated as an optional layer in FIG. 1. The materials of these solder layers can be, in particular, solder materials having a comparatively low melting point, containing tin for example.

Although the reaction temperature in the region of the multilayer film inserted between the strip conductors during the formation of the connection layer 23 is very high, the superconducting layer 5 further inward remains excluded from this great heating even during the reaction. Thermal damage to the superconducting layer 5 is advantageously avoided as a result. This can be realized even with a comparatively small distance d between the superconducting layer 5 and the interposed multilayer film. Since FIG. 2 does not illustrate the multilayer film itself, but rather only the state after the formation of the connection layer, the distance between the superconducting layer 5 and the connection layer 23 is illustrated here as representative of the distance d defined above. These two distances are approximately equal, however, if the majority of the connection layer 23 here is formed from the material of the original multilayer film.

Figure 3:
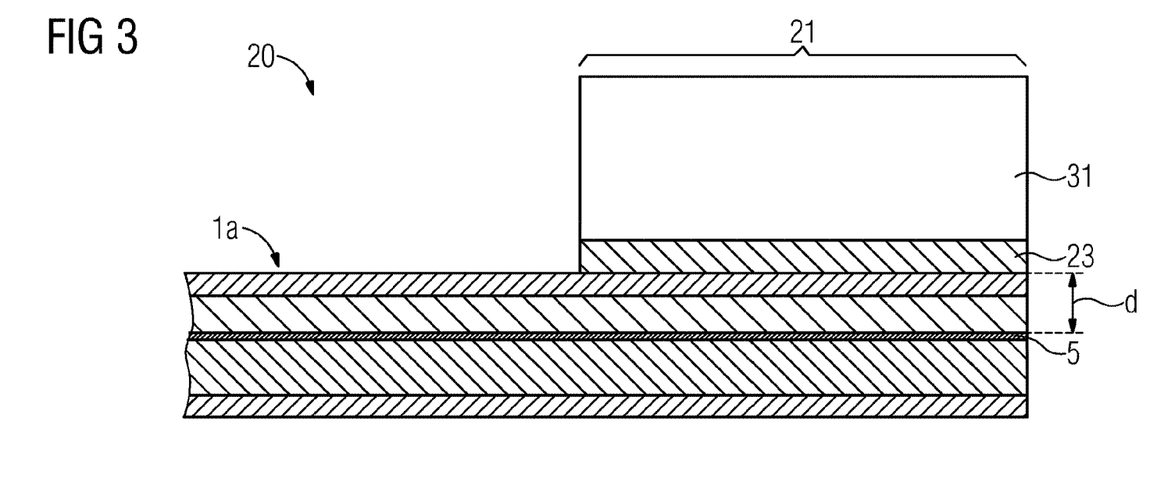
FIG. 3 shows a schematic longitudinal section of a strip conductor that has been contacted with a contact piece according to the method according to the invention.

FIG. 3 shows a schematic longitudinal section through an electrical conductor composite assembly 20 according to a second exemplary embodiment of the invention. A first strip conductor 1a is once again shown, but here it was not contacted with a further strip conductor, but rather with a normally conducting contact piece 31. The normally conducting contact piece 31 here is configured as a solid copper block. The electrical contacting of the first strip conductor 1a with this contact piece was carried out in a similar manner to that as described in association with the example in FIG. 2. In this regard, here, too, the process heat necessary for forming the electrical connection was generated by a strong exothermic reaction in a reactive multilayer film inserted between the elements to be contacted. On account of said process heat, an electrical connection layer 23 was produced initially in liquid form and subsequently solidified during cooling down. Here, too, the connection layer 23 formed comprises in any case the starting materials of the multilayer film and optionally additionally copper from the adjoining surfaces of the adjacent elements 1a and 31. It furthermore optionally additionally comprises a solder material having a low melting point composed of solder layers, which are not illustrated here but are optionally applied on the surfaces to be contacted.

Figure 4:
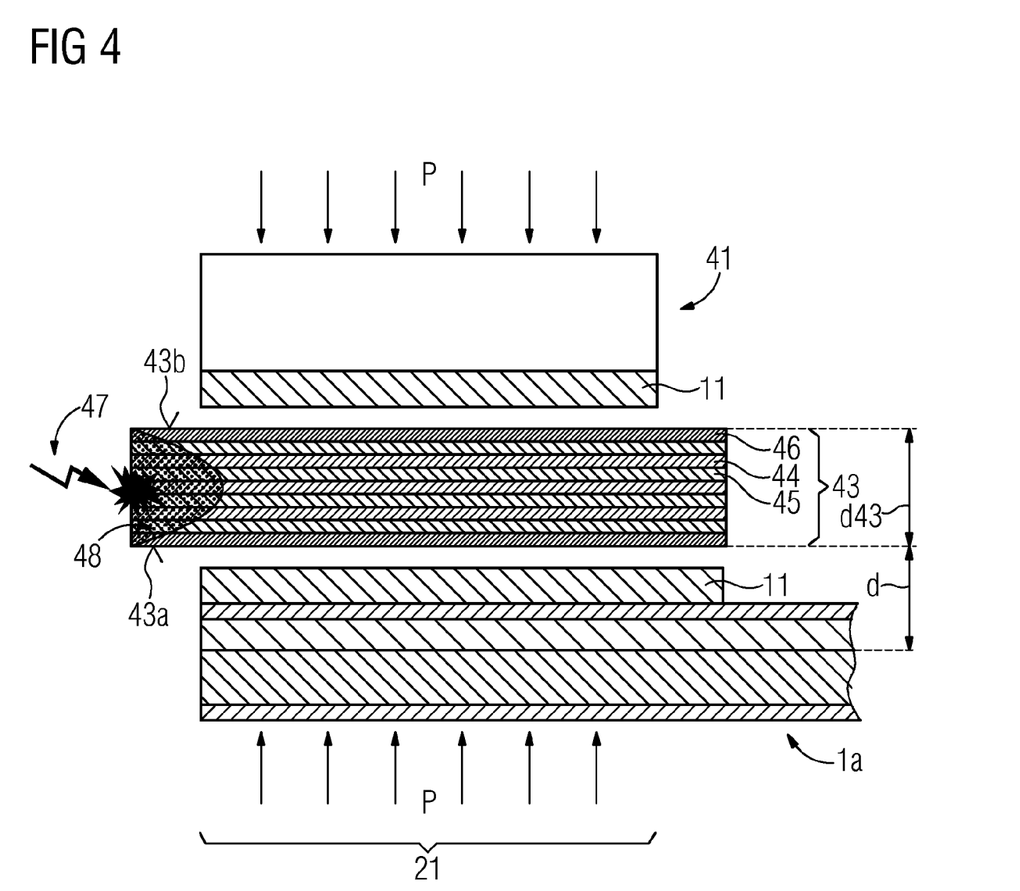
FIG. 4 shows a schematic illustration of a contacting method during the triggering.

FIG. 4 shows a schematic illustration of one exemplary embodiment of the contacting method according to the invention during the triggering of the exothermic reaction. It shows a reactive multilayer film 43 inserted between the two elements to be connected. These two elements are a first superconducting strip conductor 1a and a further conductor element 41. The further conductor element 41 can be, for example, a second superconducting strip conductor as in FIG. 2 or else a normally conducting contact piece as in FIG. 3. In this case, the first main surface 43a of the film is in areal contact with the superconducting strip conductor 1b, and the second main surface 43b situated opposite is in areal contact with the further conductor element 41. In order to produce the permanent electrically conductive connection between the two elements 1a and 41 to be contacted, the latter are jointly pressed together with the interposed film 43 with a pressing pressure p. In this case, of course, the gaps between the individual elements are closed, said gaps being illustrated in FIG. 4 merely for the sake of clarity.

The reactive multilayer film 43 from the example in FIG. 4 comprises a layer system having an alternating sequence of first partial layers 44 and second partial layers 45. Only three first partial layers 44 and four second partial layers 45 are illustrated by way of example in FIG. 4. These partial layers are intended, however, in each case to be representative of a significantly higher number of such partial layers. A nanostructured film is involved, in particular, in which the layer thickness of the individual partial layers 44 and 45 is thus less than 1 µm. In this case, the first partial layers 44 are formed from a first starting material and the second partial layers 45 are formed from a second starting material. These two starting materials can react with one another in a strongly exothermic reaction upon suitable triggering. By way of example, the first starting material can be nickel and the second starting material can be aluminum. During the exothermic chemical reaction of these two materials, electrically conductive nickel aluminide is formed and thermal energy is simultaneously released.

The triggering of the exothermic chemical reaction in the film 43 is initiated by a triggering pulse 47 illustrated schematically in FIG. 4. Said pulse can be for example an electrical, optical and/or thermal pulse. In the partial region of the film in which the triggering pulse 47 takes effect, the activation energy of the exothermic reaction is exceeded and the two starting materials of the different partial layers can react with one another. As a result of the heat of reaction released in the process, the reaction region 48 of the exothermic reaction propagates laterally through the film. This takes place at a comparatively high speed, wherein the high reaction temperature is present only for a very short time at a given location of the film. The total thickness of the film 43 is identified by the reference sign d43 in FIG. 4. It can be a few 10 µm for example.

In the example in FIG. 4, the two elements 1a and 41 to be connected have additional solder layers 11 at least in the region of the contact to be formed. The multilayer film, too, has similar solder layers 46 on its two outer surfaces. These solder layers advantageously consist of a solder material having a low melting point and can contribute to the formation of an electrical contact having a comparatively low resistance. However, they are generally optional in each case. For the formation of a permanent areal electrical contacting, it is sufficient if an electrically conductive connection layer 23 is formed from the materials of the film and optionally additionally from the material of the adjoining surfaces of the elements to be connected.

LIST OF REFERENCE SIGNS

1 Superconducting strip conductor
1a First superconducting strip conductor
1b Second superconducting strip conductor
3 Substrate
5 Superconducting layer
7 Normally conducting cover layer
9 Normally conducting stabilization layer
10 Contact area
11 Solder layer
20 Electrical conductor composite assembly
21 Contact region
23 Connection layer
31 Contact piece
41 Further conductor element
43 Reactive multilayer film
43a First main surface
43b Second main surface
44 First partial layer
45 Second partial layer
46 Solder layer
47 Triggering pulse
48 Reaction region
d Distance
d43 Thickness of the multilayer film
p Pressing pressure

The invention claimed is:
1. A method for forming an electrical contacting between a first superconducting strip conductor and a further electrical conductor element, wherein the first superconducting strip conductor comprises a superconducting material that provides a first electrical path through the first superconducting strip conductor and an outermost stabilizing layer that provides a backup electrical path through the first superconducting strip conductor, wherein the outermost stabilizing layer is configured to maintain electrical continuity of the first superconducting strip conductor when a resistance of the superconducting material increases, the method comprising:
bringing a contact region of the outermost stabilizing layer of the first superconducting strip conductor into areal contact with a first main surface of a reactive multilayer film,
bringing a second main surface of the reactive multilayer film that faces away from the first main surface into areal contact with the further electrical conductor element,
forming a permanent electrically conductive connection between the first superconducting strip conductor and the further electrical conductor element by subsequently triggering an exothermic chemical reaction in the reactive multilayer film, wherein a reaction temperature of the exothermic chemical reaction is between 1000° C. and 2000° C.,
locally melting a surface of the outermost stabilizing layer during the exothermic chemical reaction so that the permanent electrically conductive connection comprises material of the outermost stabilizing layer, and
wherein a lateral propagation speed of the exothermic chemical reaction and a heat capacity of the first superconducting strip conductor are configured to ensure a temperature of superconducting material adja- cent the contact region remains below 200° C. throughout the forming of the permanent electrically conductive connection.

2. The method as claimed in claim 1, wherein the permanent electrically conductive connection formed is a soldered connection between the first superconducting strip conductor and the further electrical conductor element.

3. The method as claimed in claim 2, wherein the soldered connection is formed by a connection layer, a majority of which is formed from materials of the reactive multilayer film.

4. The method as claimed in claim 2, wherein the soldered connection is formed by a connection layer comprising materials of the reactive multilayer film and additionally material of at least one further solder layer.

5. The method as claimed in claim 4, wherein, before the exothermic chemical reaction is triggered, the at least one further solder layer is present as a coating in the contact region of the first superconducting strip conductor and/or as a coating of the further electrical conductor element.

6. The method as claimed in claim 1, wherein the first superconducting strip conductor and the further electrical conductor element are pressed against one another during the triggering of the exothermic chemical reaction.

7. The method as claimed in claim 1, wherein the further electrical conductor element is a second superconducting strip conductor.

8. The method as claimed in claim 1, wherein the further electrical conductor element is a normally conducting contact piece.

9. The method as claimed in claim 1, wherein the triggering of the exothermic chemical reaction is initiated by an electrical triggering pulse, by an optical triggering pulse, and/or a thermal triggering pulse.

10. The method as claimed in claim 1, wherein material of the reactive multilayer film comprises aluminum and/or nickel.

11. The method as claimed in claim 1, wherein the reactive multilayer film has a total thickness in a range of between 10 µm and 300 µm.

12. The method as claimed in claim 11, wherein the total thickness is in a range of between 20 µm and 200 µm.

13. The method as claimed in claim 1, wherein the reactive multilayer film comprises a nanostructured multilayer system.

14. The method as claimed in claim 1, wherein locally melting a surface of the outermost stabilizing layer during the exothermic chemical reaction comprises incipiently melting the outermost stabilizing layer.

15. The method as claimed in claim 1, wherein the lateral propagation speed of the exothermic chemical reaction and the heat capacity of the first superconducting strip conductor are configured such outside the contact region of the outermost stabilizing layer a temperature of the first superconducting strip conductor remains below 100° C. throughout the forming of the permanent electrically conductive connection.

16. A method for forming an electrical contacting between a first superconducting strip conductor and a further electrical conductor element, wherein the first superconducting strip conductor comprises a superconducting material that provides a first electrical path through the first superconducting strip conductor and an outermost stabilizing layer that provides a backup electrical path through the first superconducting strip conductor, the method comprising:
bringing a contact region of the outermost stabilizing layer of the first superconducting strip conductor into areal contact with a first main surface of a reactive multilayer film;
bringing a second main surface of the reactive multilayer film that faces away from the first main surface into areal contact with the further electrical conductor element;
forming a permanent electrically conductive connection between the first superconducting strip conductor and the further electrical conductor element by subsequently triggering an exothermic chemical reaction in the reactive multilayer film, wherein a reaction temperature of the exothermic chemical reaction is between 1000° C. and 2000° C., and wherein the exothermic chemical reaction occurs at a distance of less than 200 µm from the superconducting material;
wherein a lateral propagation speed of the exothermic chemical reaction, a heat capacity of the first superconducting strip conductor are configured to ensure a temperature of superconducting material adjacent the contact region remains below 200° C. throughout the forming of the permanent electrically conductive connection.

17. The method as claimed in claim 16, wherein the exothermic chemical reaction occurs at a distance of less than 100 µm from the superconducting material.

* * * * *